(12) United States Patent
Lee et al.

(10) Patent No.: US 7,255,820 B2
(45) Date of Patent: Aug. 14, 2007

(54) PROCESS FOR THE MANUFACTURE OF ELASTIC POLYURETHANE FIBER AND THE ELASTIC POLYURETHANE FIBER MADE THEREBY

(75) Inventors: Tae-woo Lee, Anyang-si (KR); Seung-won Seo, Kunpo-si (KR); Seung-hyun Jang, Kwangju-kwangyeoksi (KR)

(73) Assignee: Hyosung Corporation, Seoul (KR)

( * ) Notice: Subject to any disclaimer, the term of this patent is extended or adjusted under 35 U.S.C. 154(b) by 472 days.

(21) Appl. No.: 10/719,758

(22) Filed: Nov. 21, 2003

(65) Prior Publication Data

US 2004/0106733 A1    Jun. 3, 2004

(30) Foreign Application Priority Data

Nov. 29, 2002    (KR) ...................... 10-2002-0075228

(51) Int. Cl.
*D01F 6/70*    (2006.01)
*C08L 75/04*    (2006.01)

(52) U.S. Cl. ........................... 264/172.13; 264/172.18; 525/66; 525/92 C; 525/127; 525/130

(58) Field of Classification Search ...................... None
See application file for complete search history.

(56) References Cited

U.S. PATENT DOCUMENTS 4,251,642 A * 2/1981 Tan et al. ...................... 525/66
4,831,096 A * 5/1989 MacLeay .................. 525/333.6
5,539,054 A * 7/1996 LaFleur ....................... 525/125

FOREIGN PATENT DOCUMENTS

| | | | |
|---|---|---|---|
| DE | 301044 | * | 10/1992 |
| JP | 43-639 | | 1/1943 |
| JP | 60126322 | * | 7/1985 |
| JP | 63-53287 | | 10/1988 |
| JP | 63-53288 | | 10/1988 |
| JP | 316922 | | 12/1995 |
| KR | 2001-0005854 | | 1/2001 |
| KR | 2001-0016788 | | 3/2001 |

* cited by examiner

*Primary Examiner*—David J. Buttner
(74) *Attorney, Agent, or Firm*—Michael J. Striker

(57) ABSTRACT

Disclosed is a process for the manufacture of an elastic polyurethane fiber, including mixing one component selected from among polystyrene polymers or polystyrene copolymers having a number average molecular weight of 50,000–500,000 with polyurethane having a number average molecular weight of 15,000–100,000, to prepare a polymer mixture, which is then spun. The polyurethane elastic fiber made by the method is also provided, which is greatly increased in heat set properties, with a very low rate of change of fundamental properties as the results compared with conventional elastic polyurethane fibers. Hence, the elastic polyurethane fiber can be directly applied for preparation of end products requiring superior heat set properties with no change of conventional conditions of the process.

2 Claims, No Drawings

PROCESS FOR THE MANUFACTURE OF ELASTIC POLYURETHANE FIBER AND THE ELASTIC POLYURETHANE FIBER MADE THEREBY

CROSS-REFERENCE

The invention described and claimed hereinbelow is also described in Korean application 2002-0075228, filed Nov. 29, 2002. This Korean Patent Application, whose subject matter is incorporated here by reference, provides the basis for a claim of priority of invention under 35 U.S.C. 119 (a)–(d).

BACKGROUND OF THE INVENTION

1. Field of the Invention

The present invention is related to a process for making an elastic polyurethane fibers, and the elastic polyurethane fibers prepared by the above method. More specifically, the present invention relates to a process for preparing an elastic polyurethane fiber, including mixing a polystyrene polymer or copolymer having a number average molecular weight of 50,000–500,000 with polyurethane having a number average molecular weight of 15,000–100,000, followed by a spinning process; and thusly preparing elastic polyurethane fiber.

2. Description of the Related Art

Generally, polyurethane is obtained by firstly polymerizing polyol as a diol compound having a high molecular weight with excessive diisocyanate to form a prepolymer of an isocyanate-terminated polyol, which is then dissolved in a proper solvent, and added with a diamine- or diol-based chain extender for a second polymerization.

For the preparation of a polyurethane fiber, there are a dry spinning process, a wet spinning process, a chemical spinning process, or a melt spinning process. In the dry spinning process, a polyurethane is prepared in the melt, dissolved in a solvent to obtain a polyurethane solution, and then dry spun. Further, in the wet spinning process, a polyurethane is synthesized directly in a solvent. As it is formed, the polyurethane dissolves in the solvent to form a solution that is then dry spun. Also, the chemical spinning process is carried out by extruding an isocyanate-terminated prepolymer solution into an amine-based chain extender solution through a nozzle to effect a chain-extension.

In addition, the melt spinning process is performed by extruding melted polyurethane through a nozzle, and cooling the extruded polyurethane.

Thusly prepared polyurethane fiber may be mixed with other fibers, for example, polyacrylonitril fiber, wool, cotton, silk, etc., according to desirable end uses. As used in common, spandex has its meaning, that is a manufactured fiber in which the fiber-forming substance is a long chain synthetic elastomer comprised of at least 85% by weight of a segmented polyurethane.

The polyurethane fiber is variously applied, due to unique properties, such as high elasticity. According to the enlargement of applicable fields, there are required polyurethane fibers further having novel properties in addition to conventional properties. By this time, polyurethane fibers have been developed to have further enhanced heat resistance and elasticity and, in recent years, demands for polyurethane fibers having excellent heat set properties become gradually increasing.

Therefore, intensive research into improvement of heat set properties of the polyurethane fiber has been conducted.

In this regard, Japanese Patent Publication Nos. Sho. 63-53287 and 63-53288 disclose method of improving heat set properties of an elastic polyurethane fiber by use of specific additives, such as a diisocyanate dimer or powdered silica. However, the above method is disadvantageous in that the additives are inconsistently dispersed into the polyurethane solution. Further, it is difficult to choose a proper mixing condition, and the polymerization process by itself becomes complicated.

In addition, Japanese Patent Publication No. Sho. 43-639 discloses a method of preparing polyurethane, including reacting a mixture of a polymer diol and a low molecular weight diol 1–3 times as much as the mol of the polymer diol, with a diisocyanate compound, to prepare a hydroxide-terminated prepolymer and an isocyanate-terminated prepolymer, which are then reacted together to produce a polyurethane polymer. However, thusly obtained polyurethane is subjected to only a melt spinning process.

Further, Korean Patent Laid-Open Publication No. 2001-5854 discloses a method of preparing an elastic polyurethane fiber, characterizes in that two prepolymers, each having an isocyanate termination and a hydroxide termination with relatively similar viscosities are reacted together to obtain a liquid polyurethane polymer, which is then continuously extruded through a nozzle. According to this method, since the two prepolymers have similar viscosities, it is possible to uniformly mix each other upon a second polymerization, thus increasing the mixing effect and spinning stability. However, the above method is more complicated process, compared to conventional processes of preparing an elastic polyurethane fibers. As well, since the mixing effect and spinning stability are obtained by controlling the conditions of the process, the above method is not practical.

Moreover, Japanese Patent Laid-open Publication No. Hei. 7-316922 discloses a relatively simple method capable of improving heat set properties of an elastic polyurethane fiber, in which when the polyurethane fiber is prepared by a conventional process, a part of a polyurethane component is replaced with a thermoplastic polyurethane resulting from the use of a diol as a chain extender of the second polymerization. The elastic polyurethane fiber prepared by the above method has an improved heat set properties, but is decreased in elongation, with a drastic increase of modulus.

Also, there is described a method of replacing a part of a conventionally prepared polyurethane by a low molecular weight styrene maleic anhydride-based copolymer having a number average molecular weight less than 5,000. However, with the intention of improving heat set properties and maintaining fundamental properties of the fiber, the above method is not preferable.

In Korean Patent Laid-open No. 2001-16788, there is disclosed a method of improving heat set properties of a polyurethane fiber by following an additional thermal treatment after a dry spinning. However, this method is disadvantageous in that other devices are further required, in addition to a conventional spinning device. Additionally, the fiber is excessively heated, thereby improving the heat set properties but decreasing fundamental properties, such as elongation and modulus.

SUMMARY OF THE INVENTION

Leading to the present invention, the intensive and thorough research into an economical process for the manufacture of an elastic polyurethane fiber having superior heat set properties, carried out by the present inventors aiming to avoid the problems encountered in the related arts, discovered a predetermined amount of a polystyrene polymer or polystyrene copolymer having a specific molecular weight is mixed with a conventional polyurethane solution and then spun, whereby the elastic polyurethane fiber of greatly improved thermosetting properties can be prepared, without alternation of conventional conditions of the process and devices, while superior fundamental properties of conventional elastic polyurethane fibers are maintained as they are, that is, 200% modulus is not drastically changed or elongation is not remarkably decreased.

Therefore, it is an aspect of the present invention to provide a method of preparing an elastic polyurethane fiber having greatly improved heat set properties while superior properties of conventional elastic polyurethane fibers are maintained, without the use of an additional device or the change of preparation conditions.

Another aspect of the present invention is to provide an elastic polyurethane fiber having significantly improved heat set properties, prepared by the above method.

According to an embodiment of the present invention, there is provided a method of preparing an elastic polyurethane fiber, including mixing a polystyrene polymer or polystyrene copolymer having a number average molecular weight of 50,000–500,000 with polyurethane having a number average molecular weight of 15,000–100,000, to prepare a polymer mixture, which is then spun.

According to another embodiment of the present invention, there is provided an elastic polyurethane fiber having superior heat set properties while maintaining fundamental properties of conventional elastic polyurethane fibers, prepared by the above method.

DETAILED DESCRIPTION OF THE INVENTION

Hereinafter, a detailed description will be given of a process for the manufacture of an elastic polyurethane fiber and the elastic polyurethane fiber prepared by the above process.

Based on the present invention, a polystyrene polymer or a polystyrene copolymer having a number average molecular weight of 50,000–500,000 is mixed with polyurethane having a number average molecular weight of 15,000–100,000, and then spun.

In the present invention, when a number average molecular weight of the polystyrene polymer or polystyrene copolymer is less than 50,000, heat set properties are not improved. While, if a number average molecular weight of the polystyrene polymer or polystyrene copolymer is more than 500,000, the spinning stability becomes lower, and fundamental properties of the elastic polyurethane fiber are severely degraded. The polystyrene polymer useful in the present invention includes, for example, polystyrene, p-alkylpolystyrene, such as p-methylpolystyrene, p-arylpolystyrene and the like. Further, the example of the polystyrene copolymer includes styrene-acrylonitrile copolymer (SAN), styrene-butadiene copolymer (SBS), styrene-butadiene block copolymer, acrylonitrile-butadiene-styrene copolymer (ABS), and the like.

Moreover, it is preferable that a mixing ratio by weight of the polystyrene polymer or polystyrene copolymer to polyurethane ranges from 1:99 to 30:70 (w/w). More preferably, the mixing ratio is in the range of 1:99 to 25:75 (w/w). Most preferably, the mixing ratio is in the range of 1:99 to 10:90. If the polystyrene polymer or copolymer is used in the amount smaller than 1 part by weight, a final the elastic polyurethane fiber has poor heat set properties. On the other hand, if the polystyrene polymer or copolymer is used in the amount larger than 10 wt % the spinning stability becomes inferior, and fundamental properties of the elastic polyurethane fiber are severely degraded. In the present invention, the spinning process is not particularly limited, and a dry spinning process, a wet spinning process, or a melt spinning process may be used, in addition to a chemical spinning process.

The elastic polyurethane fiber made by the method of the present invention has greatly improved heat set properties, while maintaining fundamental properties of conventional polyurethane, for example, elongation and 200% modulus.

Having generally described in this invention, a further understanding can be obtained by reference to examples and comparative examples which are provided herein for purposes of illustration only and are not intended to be limiting unless otherwise specified.

Heat set properties and modulus of the elastic polyurethane fiber of the present invention are measured as follows.

(1) Heat Set Properties

An elastic polyurethane fiber made by this invention is 100% elongated, thermally treated at 160° C. for 1 min in the state of exposed to the atmosphere, and then cooled to room temperature. Subsequently, a length of the fiber (after thermal treatment) is measured, and heat set properties are calculated according to the following equation:

Heat set ratio(%)={(fiber length after thermal treatment−initial fiber length before being elongated/(fiber length after being elongated−initial fiber length before being elongated)}×100

(2) Modulus

A produced fiber is cut in a length of 5 cm, and 200% elongated at a rate of 500 mm/min. Then, modulus of the fiber is measured under the conditions of 20° C. and 65% relative humidity by use of an Instron 5565 of Instron Co., LTD.

EXAMPLE 1

Polystyrene having a number average molecular weight of 100,000 was completely dissolved in a dimethylacetamide (DMAC) solvent, to obtain a polystyrene polymer solution, which was then mixed with a polyurethane solution having a number average molecular weight of 100,000 (polyurethane:DMAC solution) prepared according to a conventional method, thus giving a spinning solution. As such, a mixing ratio by weight of polystyrene to polyurethane was 10:90 (w/w). Thereafter, the spinning solution was extruded into air or nitrogen by use of a spinning nozzle for dry spinning, in which the spinning conditions, such as spinning temperatures and winding rates, are accorded to conventional preparation conditions of an elastic polyurethane fibers.

Heat set properties and fundamental properties (elongation and 200% modulus) of the elastic polyurethane fiber of Example 1 were compared with those of a conventional elastic polyurethane fiber (Creora, Hyosung Co. Ltd., Korea). The results are shown in Table 2, below.

EXAMPLES 2–5

Each elastic polyurethane fiber was made in the same manner as in Example 1, with the exception that a kind and a number average molecular weight of a polystyrene polymer or polystyrene copolymer, and a mixing ratio by weight (w/w) between the polystyrene polymer or copolymer and the conventionally prepared polyurethane polymer were changed as shown in Table 1, below.

Heat set properties and fundamental properties (elongation and 200% modulus) of the elastic polyurethane fibers made by the respective Examples were compared with those of a conventional elastic polyurethane fiber (Creora, Hyosung Co. Ltd., Korea). The results are shown in Table 2, below.

COMPARATIVE EXAMPLES 1–3

Each elastic polyurethane fiber was made in the same manner as in Example 1, with the exception that a kind and a number average molecular weight of a polystyrene polymer or polystyrene copolymer, and a mixing ratio by weight (w/w) between the polystyrene polymer or copolymer and the conventionally prepared polyurethane polymer were changed as shown in Table 1, below.

Heat set properties and fundamental properties (elongation and 200% modulus) of the elastic polyurethane fibers made by Examples and Comparative Examples were compared with those of a conventional elastic polyurethane fiber (Creora, Hyosung Co. Ltd., Korea). The results are shown in Table 2, below.

TABLE 1

| No. | Polystyrene (Co) Polymer | Number Average M.W. of (Co) Polymer | Mixing Ratio by Weight (w/w) |
|---|---|---|---|
| Ex. 1 | Polystyrene | 100,000 | 10/90 |
| C. Ex. 1 | | 10,000 | |
| C. Ex. 2 | | 700,000 | |
| C. Ex. 3 | | 100,000 | 40/60 |
| Ex. 2 | p-methylpolystyrene | 150,000 | 10/90 |
| Ex. 3 | SAN | | |
| Ex. 4 | SBS | | |
| Ex. 5 | ABS | | |

TABLE 2

| | Thermo-setting (%) | 200% Modulus | | Elongation | |
|---|---|---|---|---|---|
| | | Measurement (g/d) | Change (%) | Measurement (g/d) | Change (%) |
| Ex. 1 | 70.7 | 0.15 | −4 | 670 | 8 |
| C. Ex. 1 | 40 | 0.11 | −29 | 630 | 2 |
| C. Ex. 2 | 84 | 0.07 | −50 | 850 | 37 |
| C. Ex. 3 | 85 | 0.06 | −61 | 900 | 45 |
| Ex. 2 | 68 | 0.14 | −11 | 690 | 11 |
| Ex. 3 | 69 | 0.14 | −11 | 630 | 2 |
| Ex. 4 | 65 | 0.16 | 2 | 600 | −3 |
| Ex. 5 | 65 | 0.17 | 9 | 580 | −6 |

From Table 2, it can be seen that the elastic polyurethane fiber of the this invention has high heat set properties of 65% or more, and excellent 200% modulus and elongation, with a rate of change of fundamental properties smaller than 15% as the results compared with the conventional elastic polyurethane fiber.

In cases of Comparative Examples 1 to 3, the elastic polyurethane fiber (Comparative Example 1) made by polystyrene having the molecular weight less than that of polystyrene used in the present invention, is disadvantageous in terms of inferior heat set properties and remarkably reduced fundamental properties of conventional polyurethane fibers. Likewise, the elastic polyurethane fiber (Comparative Example 2) prepared by the addition of polystyrene having the molecular weight more than that of polystyrene used in the present invention, and the elastic polyurethane fiber (Comparative Example 3) prepared by the addition of polystyrene having the amount larger than that of polystyrene used in the present invention, have good heat set properties, but are drastically degraded in 200% modulus and elongation.

As described above, the present invention provides a process for the manufacture of an elastic polyurethane fiber and the elastic polyurethane fiber prepared by the same. The elastic polyurethane fiber of the present invention has excellent heat set properties, with a very low rate of change of fundamental properties as the results compared with conventional elastic polyurethane fibers. Therefore, the elastic polyurethane fiber of this invention can be directly applied for preparation of end products requiring high heat set properties, without the change of conventional conditions of the process.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. A method for manufacturing a polyurethane elastic fiber, comprising the steps of:
   mixing one component selected from the group consisting of polystyrene, poly (p-alkylstyrene), poly (p-arylstyrene), styrene-butadiene-styrene copolymer (SBS), styrene-butadiene block copolymer, and acrylonitrile-butadiene-styrene copolymer (ABS) having a number average molecular weight of 50,000–500,000 with polyurethane having a number average molecular weight of 15,000–100,000 at a weight ratio ranging from 1:99 to 10:90, to prepare a polymer mixture; and
   spinning the polymer mixture.

2. A polyurethane elastic fiber made by the method of claim 1.

* * * * *